H. W. CHASE.
ELECTRICAL HEATER.
APPLICATION FILED JULY 21, 1917.
1,260,328.
Patented Mar. 26, 1918.
2 SHEETS—SHEET 1.
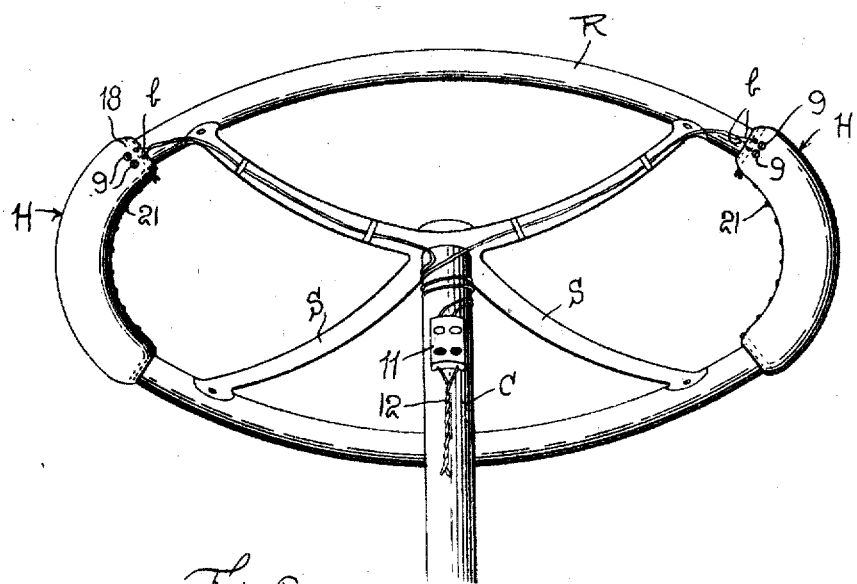
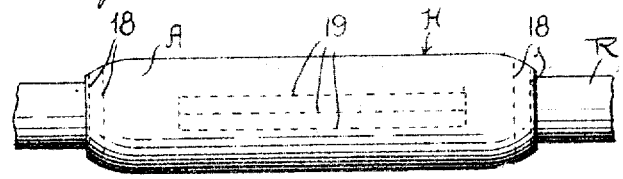
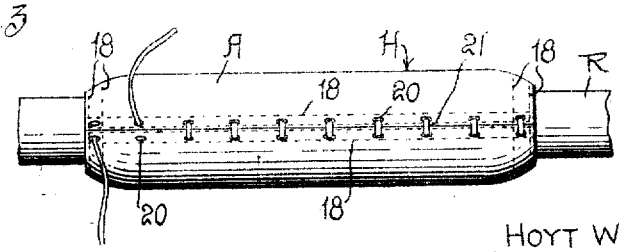
Inventor
HOYT W. CHASE
By Watson E. Coleman
Attorney H. W. CHASE.
ELECTRICAL HEATER.
APPLICATION FILED JULY 21, 1917.
1,260,328.
Patented Mar. 26, 1918.
2 SHEETS—SHEET 2.
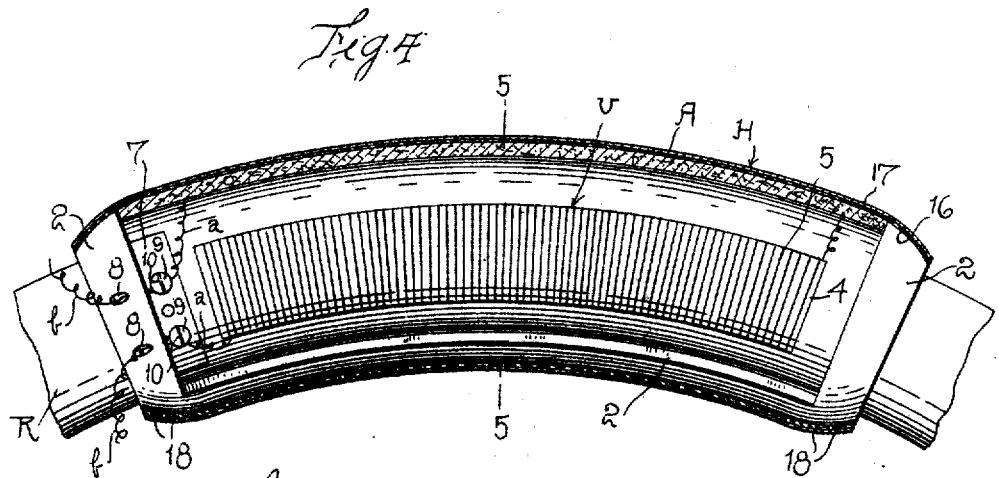
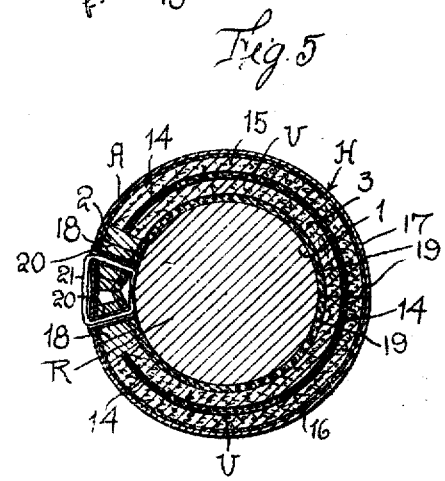
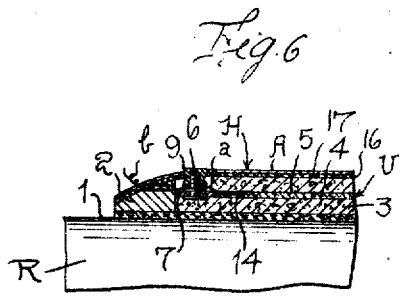
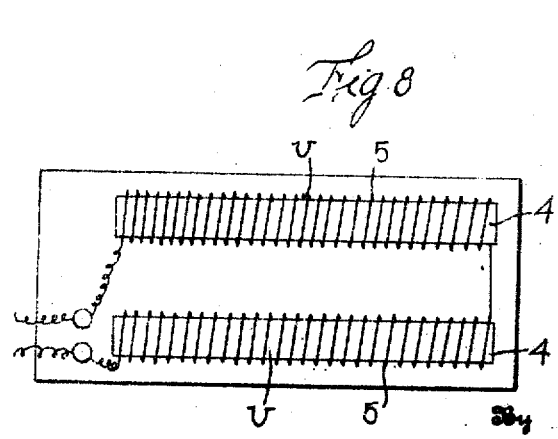
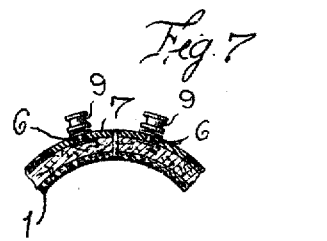
Inventor
HOYT W. CHASE
By Watson E. Coleman
Attorney

UNITED STATES PATENT OFFICE.

HOYT W. CHASE, OF INDIANAPOLIS, INDIANA, ASSIGNOR OF ONE-FOURTH TO CLARA EUGENIA KERR, OF INDIANAPOLIS, INDIANA.

ELECTRICAL HEATER.

1,260,328.   Specification of Letters Patent.   Patented Mar. 26, 1918.

Application filed July 21, 1917. Serial No. 182,043.

*To all whom it may concern:*

Be it known that I, HOYT W. CHASE, a citizen of the United States, residing at Indianapolis, in the county of Marion and State of Indiana, have invented certain new and useful Improvements in Electrical Heaters, of which the following is a specification, reference being had to the accompanying drawings.

This invention relates to certain improvements in electrical heaters and it is an object of the invention to provide a novel and improved device of this general character especially designed and adapted for use in connection with hand wheels and more particularly to a wheel comprised in a steering mechanism of an automobile, aeroplane or other conveyance.

It is also an object of the invention to provide a novel and improved device of this general character which may readily and conveniently be engaged with the rim of a wheel in such a position as to be directly grasped by the hand.

The invention also has for an object to provide a novel and improved electric heater which may be applied to the rim of a steering wheel or the like without the necessity of changing the wheel in any way.

The invention consists in the details of construction and in the combination and arrangement of the several parts of my improved electric heater wherein certain important advantages are attained and the device rendered simpler, less expensive and otherwise more convenient and advantageous for use, as will be hereinafter more fully set forth.

The novel features of my invention will hereinafter be definitely claimed.

In order that my invention may be the better understood I will now proceed to describe the same with reference to the accompanying drawings wherein—

Figure 1 is a view in perspective of a steering wheel having heaters applied thereto constructed in accordance with an embodiment of my invention;

Fig. 2 is a fragmentary view in side elevation of a steering wheel showing the heater as herein embodied applied thereto;

Fig. 3 is a fragmentary view in side elevation of the rim of a wheel and of the heater applied thereto;

Fig. 4 is an enlarged fragmentary view partly in plan and partly in longitudinal section illustrating certain details of my improved heater as herein disclosed;

Fig. 5 is a sectional view taken substantially on the line 5—5 of Fig. 4;

Fig. 6 is a fragmentary view partly in elevation and partly in longitudinal section illustrating additional details of my improved heater;

Fig. 7 is a fragmentary view partly in transverse section and partly in elevation of my improved heater with portions omitted; and Fig. 8 is a diagrammatic view disclosing certain features of my invention as herein set forth.

As disclosed in the accompanying drawings R denotes the rim of a conventional type of steering wheel and which is secured to the spokes S. C denotes a casing embodied in the steering mechanism in which the wheel is included. In practice it is desired that two heaters H constructed in accordance with my invention be secured to the rim R at substantially diametrically opposed points as is particularly illustrated in Fig. 1 of the accompanying drawings but for the purposes of disclosure it is thought that a detailed description of a single heater will suffice. In the present embodiment of my invention each of the heaters H consists of an inner layer 1 of predetermined length and of a width to extend around the rim R and said layer 1 preferably comprises a vulcanized sheet of canvas and rubber so that when the heater is applied to the rim R the layer 1 will have sufficient frictional contact with the rim R to prevent the heater H slipping.

The marginal portions of the layer 1 are defined by the outstanding strips 2 preferably of rubber with the inner walls of said strip of a thickness or depth of substantially three-eighths of an inch.

Snugly fitting within the field defined by the strips 2 is a layer 3 of asbestos or other non conductive and heat resisting material, said layer 3 being preferably of a thickness of substantially one-eighth of an inch. Resting upon the layer 3 are the transversely disposed heating units U. The units U are so spaced one from the other as to position the same above and below the rim R when the heater H is in applied position. The units U as herein disclosed are arranged in series and each of said units comprises an asbestos board 4 having disposed therearound the resistance coil 5. The free extremities of the coils 5 are electrically connected and the free terminals *a* of the coils 4 are electrically engaged with the outstanding posts 6 carried by the tapered strip 7 resting upon an end portion of the layer 3. The adjacent end strip 2 is provided with the openings 8 through which the conductors *b* are disposed for electrical connection with the posts 6 and said conductors *b* are maintained in electrical connection with the post 6 through the medium of the removable clamping caps or nuts 9. Each of the nuts or caps 9 is provided in its outer face with the groove 10 to receive a suitable implement to facilitate the application or removal thereof. As is particularly illustrated in Fig. 1 the conductors *b* are continued along a spoke S to a controlling switch 11. Co-acting with the switch 11 are the conductors 12 leading from a suitable source of electrical energy and preferably the magneto of an automobile or other conveyance. As disclosed in Fig. 1 the switch 11 co-acts with the conductors *b* of each of the heating units and it is intended that the switch 11 be of such a character as to permit each of the heaters H to operate in unison or one independently of the other.

The space surrounding the heating units U is provided with a filler 14 preferably of asbestos fiber and overlying the heating units U and the filler 14 and snugly fitting within the field defined by the strips 2 is a second layer 15 of asbestos or other insulating and heat resisting material. The layer 15 is also substantially one-eighth of an inch in thickness. At this time it might be well to state that it is preferred that the heating units U be substantially one-sixteenth of an inch thick. Overlying the layer 15 and the outer face of the strips 2 is a covering A preferably embodying two superimposed laminations, the inner lamination 16 being preferably of canvas and the outer lamination 17 preferably of leather.

The cover A is secured to the strips 2 by the rows of stitching 18 and which rows of stitching are also directed through the inner layer 1. It is also desired that the rows of stitching 19 be disposed through the cover A and the layers 1, 3, and 15 at points intermediate the heating units U and extending in a direction longitudinally of the heater H. These latter rows of stitching serve to hold the cover and the several layers in assembled relation.

Disposed through the longitudinal marginal portion of the heater are the eyelets 20 through which is adapted to be threaded the lacing 21 for securing the heater H in applied position upon the rim R or to facilitate its removal. It is preferred that the meeting edges of the heater H or the lacing 21 be arranged inside of the rim R.

From the foregoing description it is thought to be obvious that an electrical heater constructed in accordance with my invention is particularly well adapted for use by reason of the convenience and facility with which it may be assembled and operated and it will also be obvious that my invention is susceptible of some change and modification without materially departing from the principle and spirit thereof and for this reason I do not wish to be understood as limiting myself to the precise arrangement and formation of the several parts herein shown in carrying out my invention in practice except as hereinafter claimed.

I claim:

1. An electrical heater comprising an elongated tubular member provided with a longitudinally disposed slit extending the entire length thereof, said member comprising an inner layer of fabric, outstanding strips defining the marginal portions of said layer, a layer of insulating material snugly fitting within the field defined by the outstanding strips, an electrical heating unit positioned upon the second named layer, a second layer of insulating material snugly fitting within the field defined by the strips and overlying the heating unit, and means for connecting the free longitudinal margins of the member.

2. An electrical heater comprising an elongated tubular member provided with a longitudinally disposed slit extending the entire length thereof, said member comprising an inner layer of fabric, outstanding strips defining the marginal portions of said layer, a layer of insulating material snugly fitting within the field defined by the outstanding strips, an electrical heating unit positioned upon the second named layer, a second layer of insulating material snugly fitting within the field defined by the strips and overlying the heating unit, the free longitudinal margins of the member being provided with openings, and a member threaded through said openings for connecting the free marginal portions of the member.

3. An electrical heater comprising an elongated tubular member provided with a longitudinally disposed slit extending the entire length thereof, said member comprising an inner layer of fabric, outstanding strips defining the marginal portions of said layer, a layer of insulating material snugly fitting within the field defined by the outstanding strips, an electrical heating unit positioned upon the second named layer, a second layer of insulating material snugly fitting within the field defined by the strips and overlying the heating unit, a cover overlying the second named layer and the strips, means for securing the cover to the strips, said cover serving to maintain the two insulating layers and the heating unit in assembled relation, and means for connecting the free longitudinal margins of the member.

4. An electrical heater comprising an elongated tubular member provided with a longitudinally disposed slit extending the entire length thereof, said member comprising an inner layer of fabric, outstanding strips defining the marginal portions of said layer, a layer of insulating material snugly fitting within the field defined by the outstanding strips, an electrical heating unit positioned upon the second named layer, a second layer of insulating material snugly fitting within the field defined by the strips and overlying the heating unit, a fiber filling interposed between the two insulating layers and surrounding the heating unit, and means for connecting the free longitudinal margins of the member.

5. An electrical heater comprising an elongated tubular member provided with a longitudinally disposed slit extending the entire length thereof, said member comprising an inner layer of fabric, outstanding strips defining the marginal portions of said layer, a layer of insulating material snugly fitting within the field defined by the outstanding strips, an electrical heating unit positioned upon the second named layer, a second layer of insulating material snugly fitting within the field defined by the strips and overlying the heating unit, means for connecting the free longitudinal margins of the member, one of the strips being provided with an opening, and a conductor leading from a suitable source of electrical energy and extending through said opening and operatively connected with the heating unit.

In testimony whereof I hereunto affix my signature in the presence of two witnesses.

HOYT W. CHASE.

Witnesses:
- Mrs. WILLIE ABENDROTH,
CLARA E. KERR.